United States Patent [19]

Lähdemäki

[11] Patent Number: 5,420,921
[45] Date of Patent: May 30, 1995

[54] METHOD FOR THE DETECTION OF A DISABLE TONE SIGNAL OF AN ECHO CANCELLER

[75] Inventor: Heimo Lähdemäki, Pirkkala, Finland

[73] Assignee: Nokia Telecommunications Oy, Espoo, Finland

[21] Appl. No.: 81,312

[22] PCT Filed: Oct. 28, 1992

[86] PCT No.: PCT/FI92/00286
§ 371 Date: Jun. 23, 1993
§ 102(e) Date: Jun. 23, 1993

[87] PCT Pub. No.: WO93/09607
PCT Pub. Date: May 13, 1993

[30] Foreign Application Priority Data

Nov. 4, 1991 [FI] Finland .................. 915199

[51] Int. Cl.$^6$ .............................................. H04M 1/00
[52] U.S. Cl. ..................... 379/407; 379/406; 379/410; 370/32.1
[58] Field of Search .............. 379/3, 406, 407, 408, 379/410, 411; 370/32.1

[56] References Cited

U.S. PATENT DOCUMENTS

| | | | |
|---|---|---|---|
| 4,658,420 | 4/1987 | Fukushi et al. | 379/407 |
| 4,829,566 | 5/1989 | Lassaux et al. | 379/410 |
| 5,014,307 | 5/1991 | Joffe et al. | 379/410 |
| 5,029,204 | 7/1991 | Shenoi et al. | 379/407 |
| 5,123,009 | 6/1992 | Winter | 379/407 X |

FOREIGN PATENT DOCUMENTS 0097746  6/1982  Japan ....................... 379/408

*Primary Examiner*—James L. Dwyer
*Assistant Examiner*—M. Shehata
*Attorney, Agent, or Firm*—Cushman Darby & Cushman

[57] ABSTRACT

A disable tone detection method for an echo canceller, in which the disable tone signal is within a predetermined tolerance range from a nominal frequency and includes phase inversions occurring at predetermined intervals. The method includes the steps of a) removing frequencies outside the tolerance range from an input signal ($S_{in}$, $R_{in}$) by band-pass filtering (33), b) sampling (34) the filtered signal at a sampling frequency, the sampling frequency being about half of the nominal frequency, so as to alise the sample signal to the vicinity of the zero frequency, c) creating a substantially in-phase version of the aliased sample signal component, d) delaying the in-phase version by about 2n sample signal periods, where n is a positive integer, e) detecting (34) a phase inversion in the disable tone signal using an XOR operation executed on the aliased sample signal component and the delayed version thereof.

7 Claims, 3 Drawing Sheets

METHOD FOR THE DETECTION OF A DISABLE TONE SIGNAL OF AN ECHO CANCELLER

FIELD OF THE INVENTION

The invention relates to a method for the detection of a disable tone signal in an echo canceller, the disable tone signal being within a predetermined tolerance range from a nominal frequency and including phase inversions occurring at predetermined intervals.

BACKGROUND OF THE INVENTION

End-to-end connections of a data transmission system, such as a telephone network, often show long transit time delays, in consequence of which echo is observed for instance in the case of normal speech, when a signal is reflected from the far end of a connection back to the talker. An echo canceller is an analog or digital device for processing a signal, such as a speech signal, so as to reduce echo by subtracting estimated echo from the echo (signal).

Normally, an echo canceller is capable of detecting a so-called disable signal. Upon detecting the disable tone, the echo canceller is switched to a "transparent" state, in which the echo canceller does not process a signal passing through. The characteristics of the disable tone are defined accurately in CCITT recommendation V.25. A disable tone is a signal of about 2100 Hz with phase inversions at intervals of (450±25). The disable tone detection of the echo canceller responds to this particular signal, but not, e.g., to speech or a 2100 Hz signal with no phase inversions. Disable tones are monitored both at the receiving and transmitting end of each telephone channel. Prior art echo cancellers with disable tone detection are disclosed e.g. in U.S. Pat. No. 5,029,204.

SUMMARY OF THE INVENTION

The object of the invention is to provide a method for the detection of a disable tone signal in an echo canceller.

In a preferred embodiment, the method includes:
a) removing frequencies outside the tolerance range from an input signal by band-pass filtering,
b) sampling the band-pass filtered signal at a sampling frequency, the sampling frequency being about half of a given nominal frequency, the resulting sample signal component being aliased to the vicinity of a zero frequency,
c) creating a substantially in-phase version for the aliased sample signal component,
d) delaying the in-phase version by about 2n sample signal periods, where n is a positive integer,
e) detecting a phase inversion in the disable tone signal by means of a logical XOR operation executed on the aliased sample signal component and the delayed version thereof.

According to the invention, all frequencies falling outside a monitored frequency band are removed from a received signal by band-pass filtering. After this, the tendency of a signal of being aliased to lower frequencies, when the sampling frequency is lower than the Nyquist frequency, is utilized for the detection of a disable tone. To this end, the filtered signal is sampled at a sampling frequency which is only about half of the nominal frequency of the disable tone, resulting in an aliased sample signal component close to the zero frequency. When the sample rate of the original signal is for instance 8000 samples/second (PCM signal) and the sampling frequency is 1000 Hz, then only every eighth original sample signal transmitted in the telephone channel is further processed. Due to this solution, a signal processor or another device applying the method of the invention is capable of processing both signal directions in several telephone channels.

When a signal at the preset frequency and on a preset level is detected, the signal is tested in order to find a phase inversion of about 180 degrees. This takes place by means of an XOR operation executed between the aliased sample signal component and the version thereof delayed by two sample signal period. In-phase signals always have like signs (plus or minus), but if there exists a phase inversion in the disable tone, the original sample signal component and the delayed version thereof have temporarily unlike signs.

By means of the method of the invention, it is possible to provide a very simple disable tone detection requiring a short processing time.

BRIEF DESCRIPTION OF THE DRAWINGS

The invention will be explained in the following in greater detail by means of an illustrative embodiment referring to the enclosed drawings, in which.

DETAILED DESCRIPTION OF PREFERRED EMBODIMENT OF THE INVENTION

Figure 1:
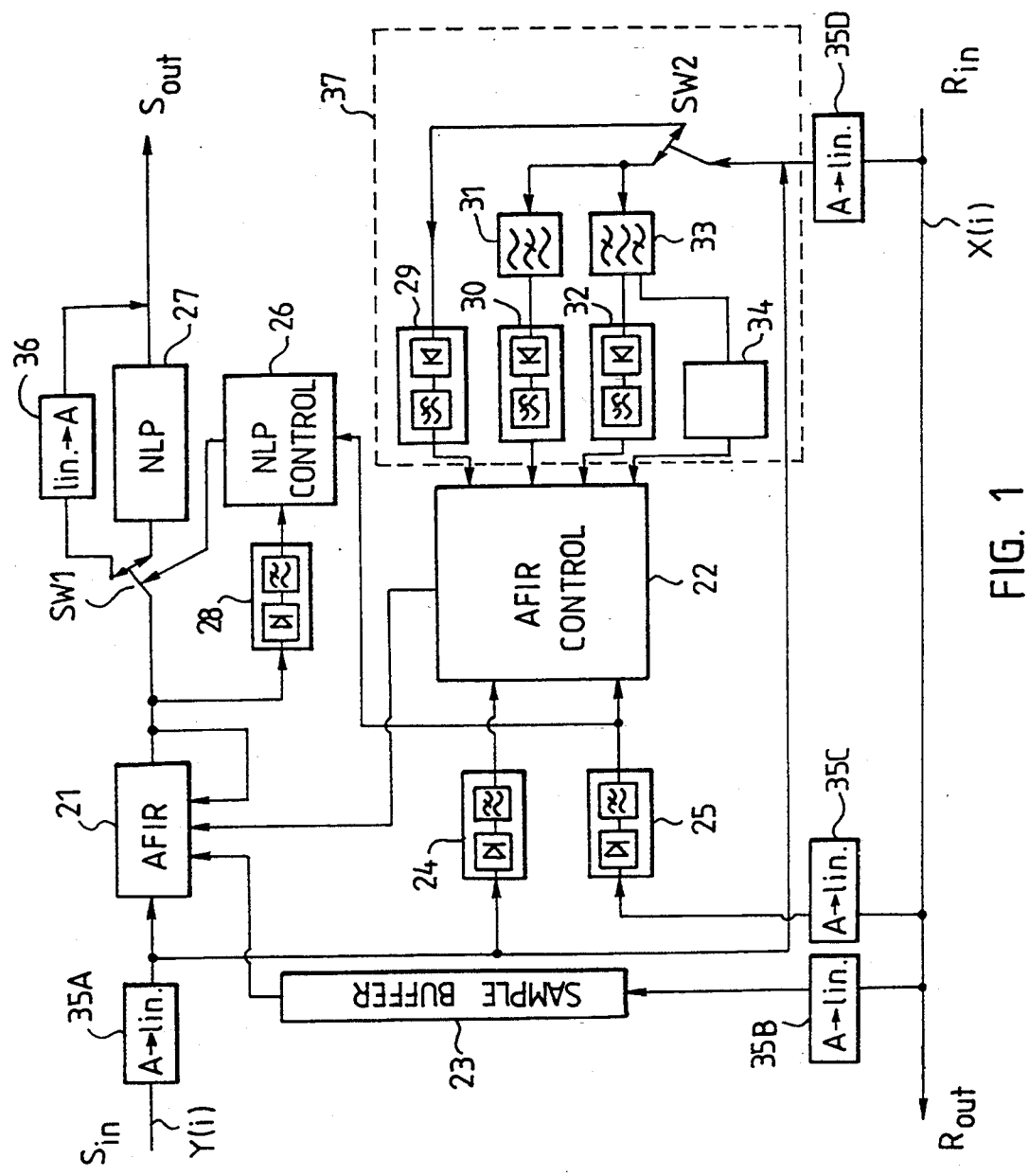
FIG. 1 shows a block diagram of an echo canceller which is useful in practicing the method according to the invention.

FIG. 1 shows a digital echo canceller, to which the method according to the present invention for detection of a disable tone signal can be applied. The echo canceller comprises an input port $S_{in}$ and an output port $S_{out}$ of a digital signal to be transmitted as well as an input port $R_{in}$ and an output port $R_{out}$ of a digital signal to be received. The echo canceller eliminates the echo only in the transmission direction, in this application called far end (the echo canceller can alternatively be constructed to eliminate the echo in the receiving direction). The opposite direction is called near end. The ports $S_{in}$ and $R_{out}$ are connected to the transmission path of the near end and the ports $S_{out}$ and $R_{in}$ to the transmission path of the far end. The echo to be cancelled is a component r(i) of a speech signal x(i) received at the port $R_{in}$ from the far end and transmitted forward over the port $R_{out}$ to the near end (to the echo path), which component is reflected from the near end.

A transmission signal y(i) of the for end is linearized by an A-law converter 35A, processed by means of an adaptive FIR filter 21 and finally applied to a changeover switch SW1. The switch SW1 controlled by a control unit 26 connects the output of the filter 21 either over a non-linear processor 27 or an A-law converter 36 to the output port $S_{out}$ of the echo canceller.

The adaptive digital filter 21 is, for instance, a digital transversal filter, which models an impulse response of the echo path. A control unit 22 controls the operation, adaptation and updating of the adaptive filter 21 on the basis of the levels of the signals y(i) and x(i), which levels are obtained by means of level detectors 24 and 25, respectively, and on the basis of an enable tone detection, which is performed by means of an enable tone detection circuitry 37.

The signal x(i) is linearized by A-law converters 35B, 35C and 35D, before being applied to a sample buffer 23, the level detector 25 and the enable tone detection circuitry 37, respectively. Samples taken from the signal x(i) are stored in the sample buffer 23, from which they are applied, if needed, to the filter 21 for the calculation of a correlation between them and samples taken from the signal y(i). Coefficients $a_k$ of the filter 21 are updated on the basis of this correlation.

In the echo canceller shown in FIG. 1, the detection of a disable tone is performed by means of the circuitry 37. Firstly, the signal y(i) received from the converter 35A and/or the signal x(i) received from the converter 35D is applied over a changeover switch SW2 to a band-pass filter 33, having a center-frequency of about 2100 Hz and a pass-band of, for instance, about 1900 to 2350 Hz, at least about 2079 to 2121 Hz. The filter 33 removes all the other frequencies except the ones within the frequency band to be examined. The frequency band required for the detector 37 is illustrated in FIG. 2.

Figure 2:
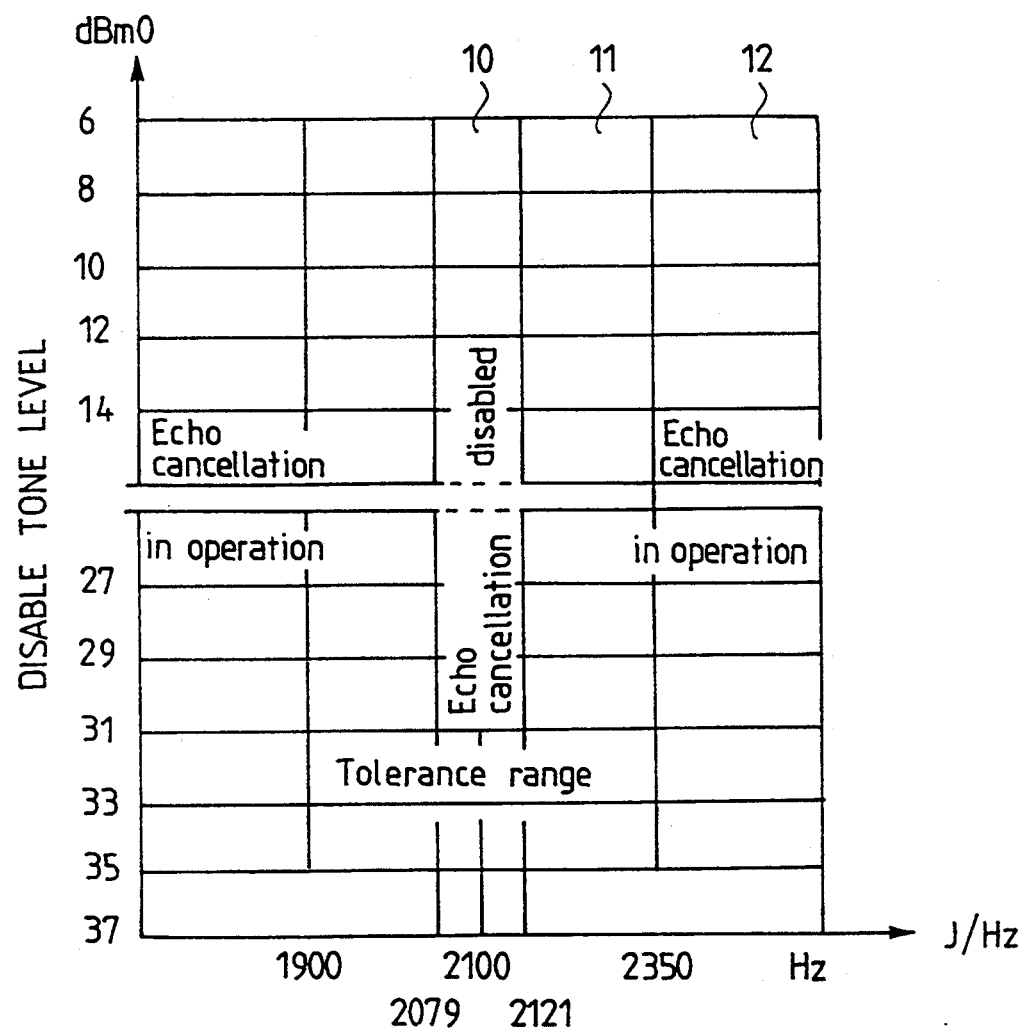
FIG. 2 shows a graph illustrating frequency characteristics of a disable tone detector, the vertical axis representing the signal level and the horizontal axis the frequency.

From FIG. 2 is seen that the detection always succeeds at frequencies 2100±21 Hz (zone 10) of the disable tone signal, while the operation at frequencies 1900 to 2350 Hz (zone 11) is undefined, i.e. the detection may work, but it does not need to work. Outside the frequency range 1900 to 2350 Hz (zone 12) the detection must not work.

The level of the output signal (i.e., enable tone signal) of the filter 33 is measured by a level detector 32. The input signal of the filter 33 is also applied to a band stop filter 31, the stop band of which is substantially the same as the pass band of the filter 33 and which removes the 1900 to 2350 Hz detection band from the input signal and leaves a surrounding guard band for the level detection by means of a level detector 30. The power level of the guard band is measured in order that the speech cannot be misinterpreted as a disable tone. Again according to FIG. 2, when white noise (300 to 3400 Hz) is applied to the detection circuitry 37 simultaneously with a 2100 Hz signal having a level of −31 dBmO, the white noise prevents the detection, if the noise level rises close to the level of the 2100 Hz signal. When the level of the disable tone signal is raised, the white noise prevents a switching off of the echo canceller within the whole frequency range on levels lower than the disable tone level.

Figure 3:
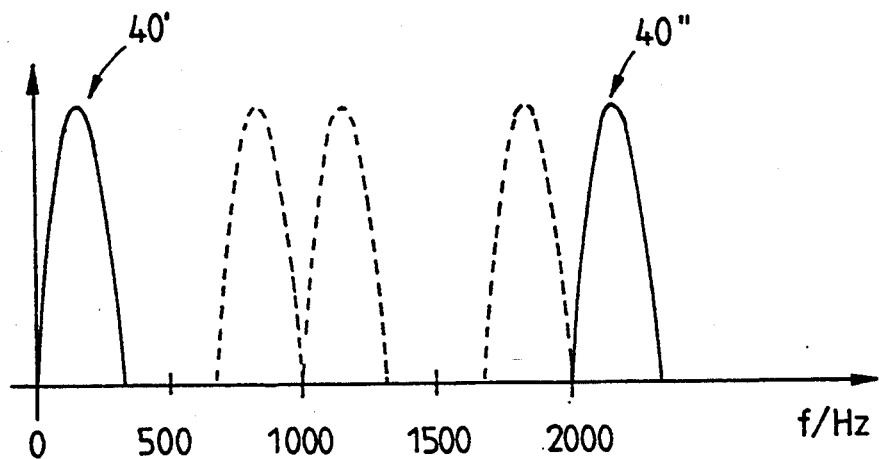
FIG. 3 illustrates an aliasing in a frequency domain due to the sampling.
Figure 4A:
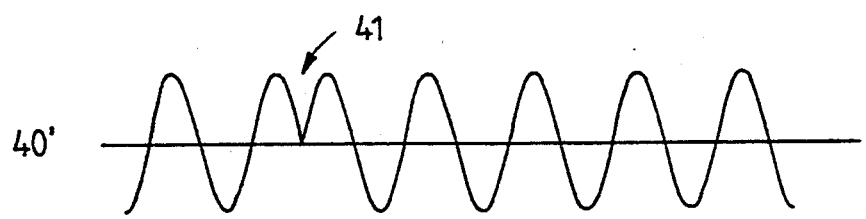
FIGS. 4A to 4C are signal diagrams illustrating the XOR operation to be used for the detection.
Figure 4B:
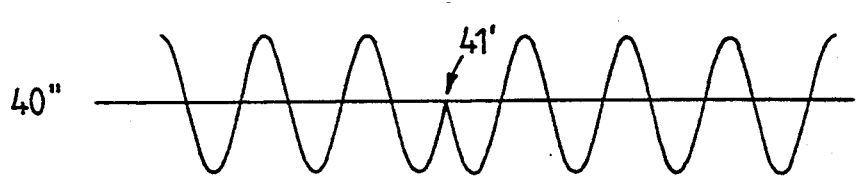
Figure 4C:
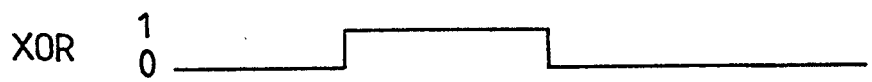

When the control unit 22 detects a signal at the preset frequency and on a preset level on the basis of the outputs of the level detectors 30 and 32, the signal is tested to find a phase inversion of 180±25 degrees in the signal. For this purpose, the output signal of the filter 33 is applied also to a phase inversion detector 34. Firstly, the phase inversion detector 34 samples the signal at a sampling frequency which is about half of the 2100 Hz tone frequency. In the preferred embodiment of the invention, the sampling frequency is 1000 Hz. As illustrated in FIG. 3, an aliased sample signal component 40' results in the vicinity of the zero frequency in consequence of sampling an original signal 40 having a frequency of about 2100 Hz. Then, the detector 34 generates a substantially in-phase component 40" delayed by 2n signal periods, preferably 2 periods, with respect to the sample signal component 40' aliased in the vicinity of the zero frequency, where n is a positive integer, as illustrated in FIGS. 4A and 4B. Then the detector 34 detects a phase inversion in the disable tone by means of an XOR operation executed between the aliased sample signal component 40' and the delayed version 40" thereof. An XOR operation can, for instance, be executed on the signs of the signals 40' and 40". When a logic XOR operation is executed on the sample signal component 40' and the delayed version 40", the signals 40' and 40" being substantially in-phase and of the same sign, the result is a logic state 0, as illustrated in FIG. 4C. When a phase inversion occurs in the signal 40' at time 41, a corresponding phase inversion does not occur in the delayed version 40" until approximately two periods later at time 41'. Then, the XOR operation temporarily gives a logic state 1, due to the phase inversion 41 in the disable tone signal a phase and sign of the delayed version 40" temporarily differ from those of the original sample signal component 40', as illustrated in FIG. 4C. The duration of the temporary change in the result of the XOR operation expresses the amount of the phase change in the disable tone signal.

Before a phase inversion can be detected, a delay is searched for for the delayed sample signal component 40", by which delay the delayed sample is located as accurately as possible at the distance of two periods from the respective sample of the original signal. This is carried out by experimenting with all delays between 7 to 20 sampling periods. These delay differences correspond to a 140 to 50 Hz frequency range, to which 2050 to 2140 Hz frequencies are aliased and which ranges, thus, is at the same time the frequency range within which a signal may be detected, while according to the specifications, frequencies between 2079 and 2121 Hz must be detected. A delay by which the XOR operation yields only one or no result with unlike signs during one signal period will be close to the actual frequency delayed by about one signal period, and the obtained delay can be used as a delay value in the subsequent stages of detection. If the XOR operation always gives a similar result, the signals are in-phase. On the other hand, if the signals are in-phase all the time, they also have the same frequencies.

If a phase inversion occurs when a frequency is searched for, it results in an unsuccessful search in the event that the phase inversion is coincident with finding of the desired frequency. In that case, the frequency search procedure restarts from the beginning. At renewal, no phase inversions should be present in the signal, because phase inversions occur at intervals of (450±30) ms and a search lasts about 100 ms at the most. The maximum detection time of a phase inversion is thus (2*100 ms)+480 ms=680 ms.

In the preferred embodiment of the invention all the blocks shown in FIG. 1 are realized by software in a digital signal processor.

The invention has been described above in connection with particular exemplifying echo canceller types and digital transversal filters. The method of the invention can, however, be applied to all echo cancellers.

The figures and the description relating to them are only intended to illustrate the present invention. As to the details, the method of the invention can vary within the scope of the attached claims.

I claim:

1. A method for the detection of a disable tone signal in an echo canceller, comprising steps of:

receiving a disable tone signal having a frequency which is within a predetermined tolerance range from a nominal frequency and includes phase inversions occurring at predetermined intervals, band-pass filtering said received disable tone signal for removing frequencies outside said tolerance range, sampling the band-pass filtered signal at a sampling frequency, and said sampling frequency being about half of said nominal frequency, for aliasing the resulting sample signal component to the vicinity of a zero frequency, creating a substantially in-phase version of said aliased sample signal component, delaying said in-phase version of said aliased sample signal component by about Zn sample signal periods, where n is a positive integer, and detecting a phase inversion in said disable tone signal using a logical XOR operation executed on said aliased sample signal component and said delayed in-phase version thereof.

2. A method according to claim 1, wherein:

the logical ZOR operation results in a first logical state, when said aliased sample signal component and said delayed version thereof are substantially in-phase and of the same sign, and in a second logical state, when the delayed in-phase version of said aliased sample signal component temporarily has, in consequence of a phase inversion occurring in said disable tone signal, a phase and sign unequal to those of said aliased sample signal component, and the phase inversion is detected on the basis of said temporary change in the result obtained by the XOR operation.

3. A method according to claim 2, wherein:

the duration of said temporary change in the result obtained by the XOR operation expresses the amount of the phase change in the disable tone signal.

4. A method according to claim 1, wherein:

the delay for delaying said aliased sample signal component by about 2n periods is searched for before the detection of the phase inversion, said search comprising:

testing with a suitable number of delays, each of which delays is about 2 signal periods for one of the frequency components of the sampled disable tone signal aliased to the vicinity of the zero frequency, and selecting the delay by which the XOR operation executed on said sample signal component and said delayed version thereof gives only one or no result indicating the unlike phases of the signals during one period of the sample signal component.

5. A method according to claim 1, wherein:

said nominal frequency is 2100 Hz, said tolerance range is 2079 to 2121 Hz, the sampling frequency is 1000 hz, the frequency to which said nominal frequency aliases in the vicinity of the zero frequency is 100 Hz and the frequency range to which the tolerance range aliases in the vicinity of the zero frequency is 140 to 50 hz.

6. A method according to claim 4, wherein:

said nominal frequency is 2100 Hz, said tolerance range is 2079 to 2121 Hz, the sampling frequency is 1000 hz, the frequency to which said nominal frequency aliases in the vicinity of the zero frequency is 100 Hz and the frequency range to which the tolerance range aliases in the vicinity of the zero frequency is 140 to 50 hz, delays between 7 and 20 sampling periods being tested in the delay search.

7. A method according to claim 1, wherein:

a phase inversion of about 155 to 205 degrees occurs in the disable tone signal at intervals of about 420 to 480 ms.

* * * * *